United States Patent [19]
Jackson et al.

[11] Patent Number: 5,967,334
[45] Date of Patent: Oct. 19, 1999

[54] IN-SITU SELF-CLEANING FEED SYSTEM FOR SEPARATION EQUIPMENT

[75] Inventors: Arnold H. Jackson, Jacksonville; Ricky A. White, Jacksonville Bch, both of Fla.

[73] Assignee: Carpco, Inc., Jacksonville, Fla.

[21] Appl. No.: 09/020,355

[22] Filed: Feb. 9, 1998

[51] Int. Cl.[6] .................................................. B07B 1/18
[52] U.S. Cl. ..................... 209/285; 209/281; 209/300; 222/485; 222/189.02
[58] Field of Search ........................ 222/485, 189.02, 222/189.04, 189.05; 209/281, 284, 285, 286, 300

[56] References Cited

U.S. PATENT DOCUMENTS

| 4,115,271 | 9/1978 | Holt | 209/285 |
| 4,120,790 | 10/1978 | Tinker et al. | 209/281 |

Primary Examiner—Andres Kashnikow
Assistant Examiner—Dinh Q. Nguyen
Attorney, Agent, or Firm—Arthur G. Yeager

[57] ABSTRACT

A process and apparatus that allows a portion of a feed system to be cleaned quickly by sequentially closing a feed passageway which leads to a sieve section; rotation of the sieve section to an upside-down position to allow blocking clumps of particles to fall away via gravity and reopening the passageway leading to the sieve section to continue with normal operation.

20 Claims, 3 Drawing Sheets

IN-SITU SELF-CLEANING FEED SYSTEM FOR SEPARATION EQUIPMENT

STATEMENT REGARDING FEDERALLY SPONSORED RESEARCH OR DEVELOPMENT

Not Applicable.

CROSS REFERENCE TO RELATED APPLICATIONS

Not Applicable.

BACKGROUND OF THE INVENTION

1. Field of the Invention

This invention relates to a process and an apparatus for separating particles by subjecting them to an electrostatic field and allowing the charged particles to migrate toward or away from electrodes in that field; and more particularly; it relates to a method and an apparatus for rapidly cleaning a portion of the feed system of the above separation apparatus which tends to become clogged with clumps of particles; this method providing a minimum time of interruption of normal production time of the machine.

2. Description of Related Art Including Information Disclosed Under 37 CFR 1.97–1.98

Not Applicable.

BRIEF SUMMARY OF THE INVENTION

This invention relates to a method and an apparatus for maintaining an electrostatic separation device in a clean operable condition free from accumulations of feed that tend to clog the narrow passageways that lead the feed from station-to-station for processing. Generally this accumulation occurs in a sieve section where the feed particles pass through a screening portion or a sieve section having many small holes through which the feed must pass. The cleaning procedure involves three consecutive steps: namely; (1) a closing of a feed passageway leading to a sieve section; (2) a rotation of the sieve section to an upside-down position to allow blocking accumulations of particles to fall away from their blocking position; and (3) a reopening of the feed passageway leading to the sieve section. This cleaning cycle leaves the separation apparatus in position to continue its separation operation.

Steps (1) and (3) in most machines merely involve (1) rotating a solid gate from an open position not obstructing a particle passageway to a closed position completely shutting off that particle passageway, and (3) rotating the solid gate from the closed position back again to the original open operating position. Step (2) clears the blocking accumulation of feed particles by the simple expedient of rotating the sieve section upside-down and thereby allowing the blocking accumulation to fall away through the exit passageway by passing the sieve section, and then continuing the rotation to return the sieve section back to its normal operating position. If experience demands it there may be an additional step of including a brush or scraper moving at right angles to the sieve holes or other means to break up any accumulations which do not readily fall apart without that additional force.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The invention is more readily understood by reference to the attached drawings wherein like parts are identified by the same reference number regardless of where that part is seen in the several sheets of drawings.

The invention involves a portion of the process machinery wherein large quantities of the particulate feed (32) are fed through a hopper (31) into two parallel exit passageways leading to two feed tubes which meter the particles through sieve-like holes in the tubes into narrow exit passageways to form two parallel curtains of particles that fall vertically as they pass on to further processing perhaps through an electrostatic field causing some of the particles to assume an electrostatic charge, and thereby to be deflected from the vertical falling direction to be collected along with other similarly charged particles in bins for further processing and/or use.

Figure 1:
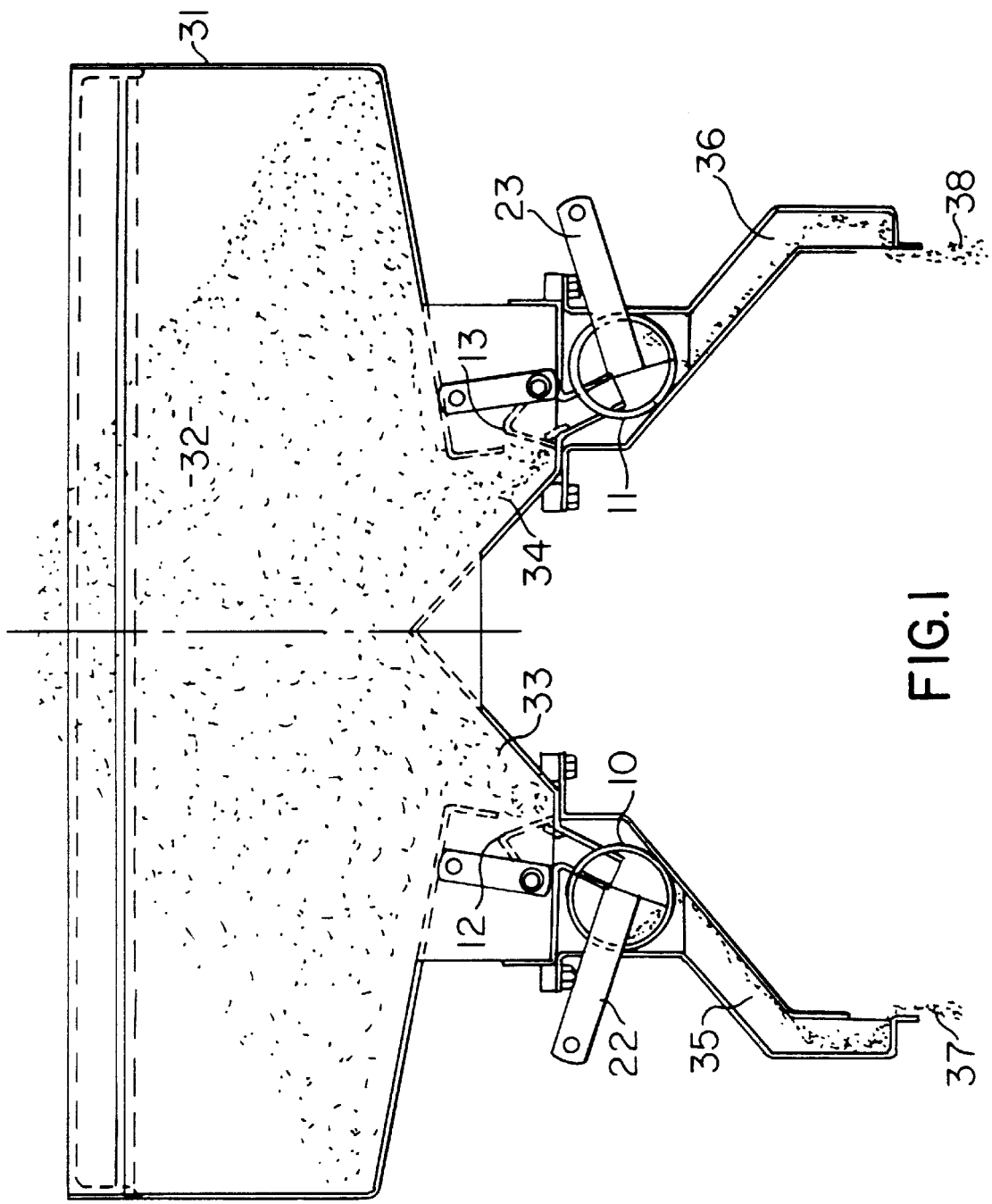
FIG. 1 is a front elevational view of the feed box of an electrostatic separator for treating particles that are to vertically fall through an electrostatic field separated by two rows of oppositely charged electrodes.

In FIG. 1 the overall process and machinery may be seen to include a large feed hopper 31 into which are loaded solid particles in bulk 32 which are, e.g., to be passed through an electrostatic separator to separate those particles which can be electrostatically charged from those particles that cannot be so charged. Such particles that might be mixed in the feed and separated through a process such as that shown here might include a mixture of sand and titanium ore, or other similar mixtures.

Hopper 31 feeds by gravity into two exit passageways 33 and 34 which in turn, direct the particles into two parallel cam feed tubes 10 and 11. These tubes 10 and 11, include holes through which the particles must pass in a manner similar to a sieve. After passing through tubes 10 and 11 the particles are directed through narrow exit passageways 35 and 36 and pass on to a final separation in the form of two free falling curtains of particles 37 and 38. In an electrostatic separator these two curtains of particles 37 and 38 would fall through an electrostatic field which would cause some of the particles to be charged and others of the particles to be unaffected by the electrostatic field. For example, in the above-mentioned example, the titanium particles might be charged while the sand particles might not be charged. The charged particles would be attracted to the electrodes in the field having a charge opposite to that of the charged particles. That attraction deflects the path of the falling charged particles sufficiently to produce a high concentration of charged particles to be collected beneath the electrodes attracting those particles, while the uncharged particles fall through the field with substantially no deflection in their falling path. Thus, to follow the above example, a concentration of titanium particles would be collected separately from a concentration of sand.

In the process machinery described above with respect to FIG. 1, there is a potential processing problem in that the feed particles must pass through sieve-like holes in the cam feed tubes 10 and 11. That potential processing problem becomes real when feed particles clump together to become aggregates of feed particles rather than individual feed particles. When the aggregates are too large to pass through the sieve-like holes in feed tubes 10 and 11, the process must be interrupted to reduce the aggregates to individual particles so that the process can continue unimpeded. The process and machinery of this invention is intended to minimize the plugging of the sieve-like holes, but when plugging does occur, this invention permits a quick and easy return to full operation.

Figure 2:
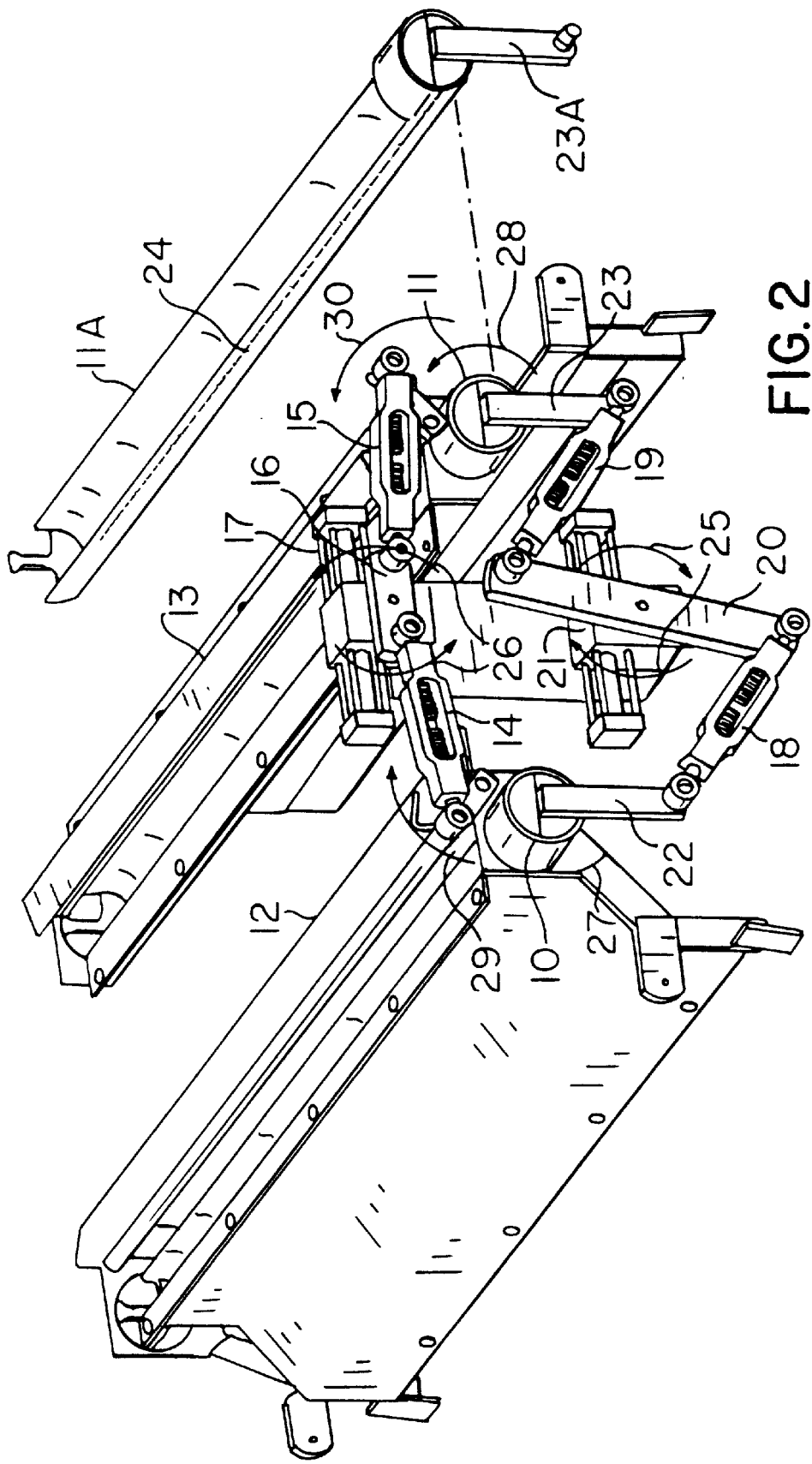
FIG. 2 is a perspective view of two discharge chutes of the feed mechanism of FIG. 1 modified by the cleaning apparatus of the present invention.

In FIG. 2 there may be seen the components of the feed process and machinery shown in FIG. 1 and pictured in perspective in FIG. 2. Cam feed tube 11 is shown separately as tube 11A when removed from the surrounding machinery so as to view the sieve-like holes 24 in the tube 11A. Holes 24 comprise a single row of holes running lengthwise of tube 11A (and also lengthwise of tube 11 although the holes cannot be seen in this view). The normal operational position of cam tube 11 is as shown for tube 11A (and also for tube 10) with holes 24 in the bottom of the trough formed by the side wall of tube 11A (or 11 or 10). The diameter of holes 24 determine the size of particle that will pass therethrough, and therefore, larger size particles or aggregates of particles will remain in the trough of tube 10A (or tube 10 or 11) until the larger particles or aggregates are removed. In order for removal of large particles or aggregates to take place the procedure in the past was to shut down the flow of feed particles into cam feed tubes 10 and 11, disengage the plugged cam feed tube from the machinery, remove all plugging particles, replace the cleaned tube, and proceed with normal processing.

Figure 3:
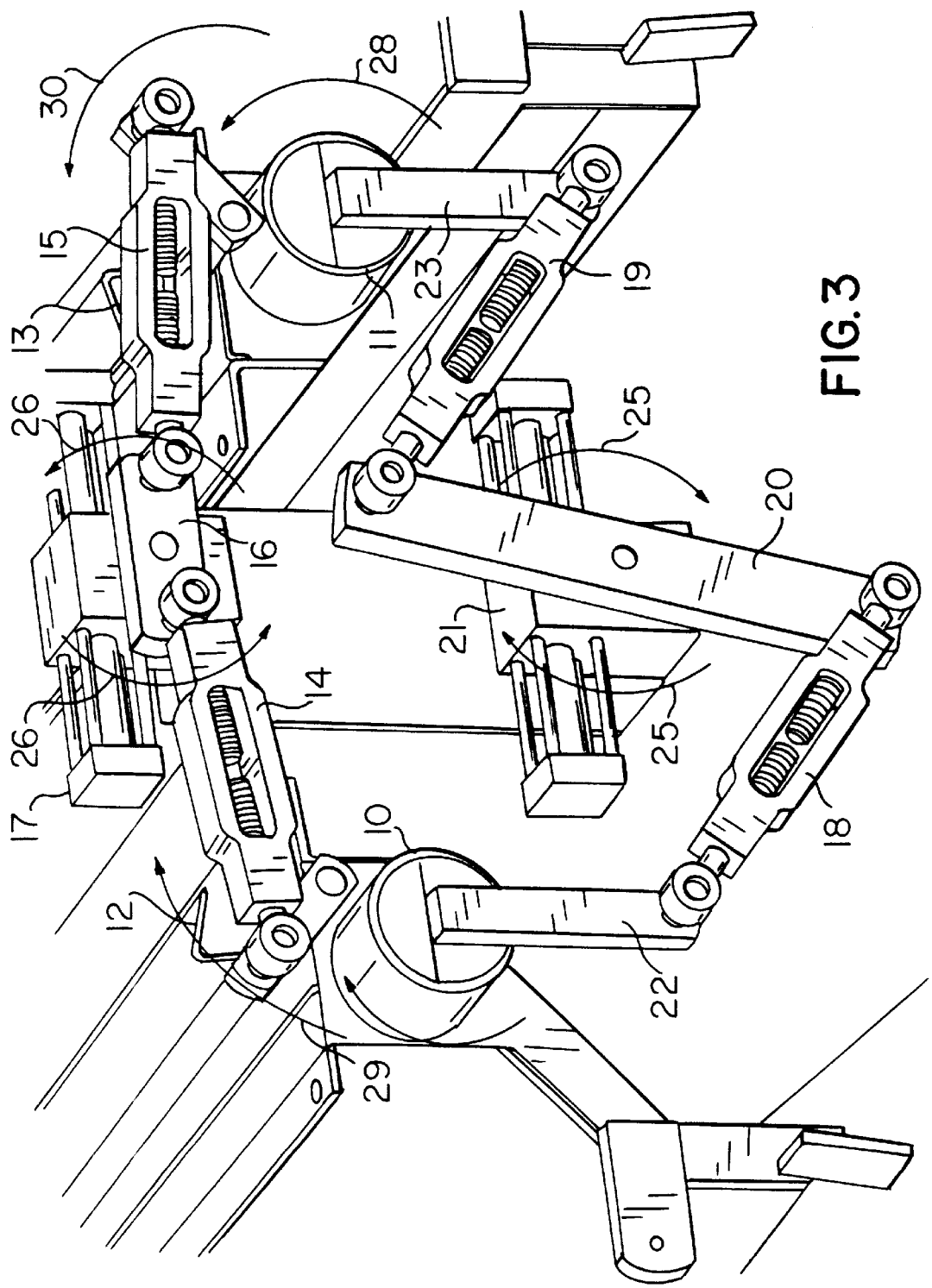
FIG. 3 is an enlarged perspective view of the central portion of FIG. 2 showing the details of the modified mechanism of this invention.

In accordance with the process machinery illustrated in FIGS. 2 and 3 this past procedure is mechanized so as to be operated without taking the machinery apart to clean out the interior portions of cam tubes 10 and 11. In accordance with the present procedure the first step is to close the gates 12 and 13 so as to stop introducing feed to tubes 10 and 11. Gates 12 and 13 are controlled by turnbuckles 14 and 15 turning their outer ends in the direction of arrows 29 and 30. This is accomplished by attaching the inner ends of turnbuckles 14 and 15 to toggle bar 16, and turning toggle bar 16 in the direction of arrows 26 by upper actuator 17 which may be driven hydraulically by air pressure or vacuum, or mechanically from a separate power source. The power needed by actuator 17 is sufficient to rotate toggle bar 16 from one stop to a second stop and reverse to the first stop.

The second step in the cleaning procedure is to rotate tubes 10 and 11 so as to cause any plugging accumulations of feed to drop out of the tube and out of exit chutes 35 and 36. This is accomplished in a manner similar to that described above in shutting gates 12 and 13. In the second step lower turnbuckles 18 and 19 are fastened at one end to cam feed tube arms 22 and 23 and at the other end to lower toggle arm 20. Lower actuator 21 turns toggle arm 20 in the direction of arrows 25, which, in turn, rotate tubes 10 and 11 while in place in the separation machinery as described with respect to FIG. 1. This rotation turns tubes 10 and 11 upside down so as to dump any accumulated particles into exit chutes 35 and 36 and then return tubes 10 and 11 to their operational positions shown in FIGS. 2 and 3. Here again, lower actuator may be powered hydraulically, pneumatically or from any secondary power source sufficient to rotate tubes 10 and 11 through 360 degrees, or through 180 degrees and then a return to the original position.

The third step of this procedure is to reverse the first step above so as to open gates 12 and 13 and return again to normal operation.

The foregoing description refers frequently to the use of this invention as a part of an electrostatic separation procedure to separate mineral from sand or other waste material. It is not meant to limit this procedure to such a process since it can be employed wherever there may be a separation of one type of particle from another type of particle through tubes that might become plugged.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by letters patent of the united states is:

1. In a mechanism for receiving a mass of dry particulate feed and delivering it elsewhere in the form of a thin free-falling curtain of said particles for further processing, the improvement which comprises means for passing said dry particulate feed through an entrance passageway into an axially rotatable elongated horizontal trough positioned above a thin exit passageway adapted to receive particles falling from said trough; said trough being pierced by a lengthwise row of holes having a size sufficiently large to allow passage of said particles therethrough; a first means for temporarily closing the entranceway of particles leading into said trough; and a second means for rotating said trough lengthwise about its horizontal axis.

2. The mechanism of claim 1 wherein said first means for temporarily closing the entranceway of particle includes a gate selectively movable from a position which does not obstruct passage of said particles through said entranceway to a position completely closing said entranceway to the passage of said particles therethrough.

3. The mechanism of claim 1 wherein said trough has a transverse cross-sectional shape that is generally semicircular with its normal operational position being such that the closed part of the semicircle faces downwardly and is below the open part of the semicircle facing upwardly; said row of holes being generally in the center of said closed part.

4. The mechanism of claim 3 wherein said exit passageway is positioned below said trough and adapted to receive particles released from said trough as they pass through any of said holes, and furthermore to receive all of said particles released from said trough whenever said trough is rotated upside down.

5. The mechanism of claim 1 wherein said first means is operated by the force of a pneumatic piston.

6. The mechanism of claim 1 wherein said second means is operated through the force of a pneumatic piston.

7. The mechanism of claim 1 wherein said mass of feed is formed into two separate streams of particles passing respectively into two said horizontal troughs each having its own lengthwise row of holes, and thence through separate exit passageways to produce two parallel thin free falling curtains of dry particles.

8. The mechanism of claim 7 wherein said two streams of particles pass through separate entrance passageways each equipped with said first means for temporarily closing said entrance passageway.

9. The mechanism of claim 8 wherein said separate entrance passageways are closable by separate gates connected by a turnbuckle to a single pneumatic piston.

10. The mechanism of claim 7 wherein said two horizontal troughs are each connected via a turnbuckle device to a rotatable arm which, in turn, is rotated through one revolution by the force of a pneumatic piston.

11. In a mechanism for receiving from a source a mass of dry particulate feed and delivering it elsewhere in the form of a thin free-falling curtain of particles for further processing, the improvement which comprises an axially rotatable elongated horizontal trough supported in and by said mechanism, an elongated entranceway from said source extending substantially parallel to said trough, a thin exit passageway positioned below said trough to receive particles falling therefrom; said trough having a plurality of holes of a size sufficiently large to allow passage of said particles therethrough along said trough, first means for temporarily closing said entranceway to prevent particles from entering said trough, and second means for rotating said trough about its horizontal axis to cause any clogging of said holes to be cleared and dumped from said trough in situ.

12. The mechanism of claim 11 wherein said first means for temporarily closing said entranceway of particles includes a gate selectively movable from a position which does not obstruct passage of particles through said entranceway to a position completely closing said entranceway to the passage of particles therethrough.

13. The mechanism of claim 11 wherein said trough has a transverse cross-sectional shape that is generally semicircular with its normal operational position being such that the closed portion of the semicircle faces downwardly and is below the open portion of the semicircle facing upwardly; said holes being generally in the center of said closed portion.

14. The mechanism of claim 13 wherein said exit passageway is positioned below said trough and adapted to receive particles released from said trough as they pass through any of said holes, and selectively to receive all of particles released from said trough whenever said trough is rotated upside down.

15. The mechanism of claim 11 wherein said first means includes a pneumatic piston.

16. The mechanism of claim 11 wherein said second means includes a pneumatic piston.

17. The mechanism of claim 11 further comprising another entrance-way, another exit passageway and a substantially identical horizontal trough, each said trough receiving a separated stream of particles from said source, and producing two parallel thin free falling curtains of particles for further processing.

18. The mechanism of claim 17 further comprising another first means for temporarily closing said another entranceway prior to rotating said another trough.

19. The mechanism of claim 18 wherein said first means and said another first means each include a selectively closable gate, said first means including a turnbuckle attached to each said gate, and a single pneumatic piston for selectively moving each said turnbuckle.

20. The mechanism of claim 17 wherein said second means includes a turnbuckle attached to each said trough, said second means including a pneumatic piston for selectively moving each said turnbuckle to rotate each said trough approximately 180° to empty said trough in situ.

* * * * *